Patented July 9, 1940

2,207,256

UNITED STATES PATENT OFFICE 2,207,256

EMULSIFYING COMPOSITION

Roland Kapp, Newark, N. J., assignor to National Oil Products Company, Harrison, N. J., a corporation of New Jersey No Drawing. Application February 10, 1938, Serial No. 189,901

11 Claims. (Cl. 252—1)

The invention relates, in general, to emulsification and, in particular, to compositions adapted to be blended with various substances to render them soluble or emulsifiable and to correlated improvements in processes for producing such compositions.

It is known that various water-insoluble substances, such as animal, vegetable or mineral oils, waxes, resins, gums, pitches, etc. find extended uses having greater advantages when such substances are rendered soluble or emulsifiable in water. Many emulsifying agents have been proposed and used for emulsifying substances of the aforementioned type. Water-soluble soaps of the higher fatty acids are well known emulsifying agents for many substances. However, when attempts have been made to employ such soaps for emulsifying substances with which they are normally immiscible, so-called mutual or blending solvents have been resorted to. These solvents are characterized by the property of being miscible with the emulsifying agent as well as the substance to be emulsified, thereby presenting a single phase or solution of the soap and substance to be emulsified. While the use of mutual or blending solvents in the aforementioned manner has proved useful in certain isolated cases, general success has not been achieved. After emulsification the blending power of the mutual solvent is materially affected which, in turn, deleteriously affects the stability of the emulsion.

The general object of the invention is to obviate the foregoing and other disadvantages.

A specific object of the invention is to provide an improved emulsifying composition for water-immiscible substances.

Another object of the invention is to provide an improved emulsifier which will readily blend with water-immiscible substances.

A further object of the invention is to provide an improved process for producing emulsifiers.

Other objects of the invention will in part be obvious and will in part appear hereinafter.

According to the invention, emulsifiers are provided comprising a partially saponified triglyceride and a glycol solvent. According to the preferred method of making the emulsifiers a triglyceride is dissolved or dispersed in a glycol solvent vehicle and partially saponified with an alkaline agent, thereby producing, in situ, a composition comprising a soap, a degraded glyceride and the unchanged solvent vehicle.

The invention accordingly comprises the several steps and the relation of one or more such steps with respect to each of the others, and the product possessing the features, properties, and the relation of constituents, which are exemplified in the following detailed disclosure, and the scope of the invention will be indicated in the claims.

The emulsifier of the invention comprises an emulsifying agent such as a soap of a suitable fatty or like acid, fatty or wax, a glycol solvent vehicle and a degraded glyceride of a higher fatty or like acid. The term "degraded glyceride" is used to denote a mono or diglyceride of higher fatty acids or similar acids such as the naphthenic acids or any mixture of these glycerides. The composition of the invention may be prepared by merely admixing the several constituents, thereby forming a composition readily dispersible in water, but it is preferred to produce the composition by dispersing and/or dissolving a suitable natural occurring triglyceride in a suitable glycol solvent vehicle and adding a strong alkali thereto in an amount sufficient to react with only one or two of the three available ester groups in the triglyceride, thereby forming the desired soap and degraded glycerides in situ. The mole ratio of soap to degraded glyceride in the resulting composition will be at least one to one. This process for preparing degraded glycerides is described in my copending application Serial No. 189,903, filed February 10, 1938. The emulsifier produced in accordance with the latter procedure is superior in many respects to the product obtained by merely admixing the several ingredients. This may be attributed to the fact that the degraded glycerides are formed in situ and thereby provide a more intimate blending action between the soap, which is also formed in situ and the substance to be subsequently emulsified therewith. In any event, however, the degraded glycerides definitely display a marked blending effect between the soap and the substance to be emulsified irrespective of their mode of incorporation.

In preparing the emulsifier of the invention according to the preferred method, any suitable triglyceride of the higher fatty acids may be used and, more particularly, the natural occurring triglycerides such, for example, as olive oil, teaseed oil, rapeseed oil, cottonseed oil; cocoanut oil, rice bran oil, peanut oil, sesame oil, corn oil, soya bean oil, fish oils, tallow, Japan wax, menhaden oil, almond oil, etc., as well as blown or hydrogenated products of these or other triglycerides. While the common strong alkalis, such as potassium hydroxide, sodium hydroxide, etc. may be employed to saponify the triglyceride, it is highly preferred to use potassium hydroxide due to the superior results obtained thereby. As aforementioned, it is necessary to effect the saponification of the triglyceride in the presence of a suitable glycol solvent vehicle, such, for example, as diethylene glycol, cellosolve, carbitol, etc. or fixtures of these or other hydroxy or hydroxy-ether solvents. The expression "glycol solvent" is employed throughout the specification and claims to include solvents which are either true glycols or derivatives of glycols such as glycol ethers or glycol esters. The temperature at which saponification is caused to take place preferably lies within the range of room temperature to 45° C. and for best results should not exceed 50° C.

The emulsifier of the invention may be admixed and blended with various water-immiscible substances to render the same readily dispersible in an aqueous medium. As examples of a few of the substances which may be rendered water-dispersible by the emulsifier of the invention, the following classes may be suggested: vegetable, animal and mineral oils, waxes, resins, gums, pitches, hydrocarbons, etc.

For a fuller understanding of the nature and objects of the invention, reference should be had to the following examples which are given merely to further illustrate the invention and are not to be construed in a limiting sense.

Example I 5.7 parts by weight of 45% KOH is added to 82 parts by weight of rapeseed oil dispersed in 12.3 parts by weight of diethylene glycol. Saponification is caused to take place at room temperature. After the KOH is completely spent, the resulting batch which is substantially optically clear, will contain, among other things, a potassium soap and a mixture of degraded glycerides. This product is an excellent emulsifier for hydrocarbons of various types and may be used, inter alia, in the preparation of cutting oils.

Example II 81.3 parts by weight of tallow in 12.2 parts by weight of diethylene glycol are saponified with 6.5 parts by weight of 45% KOH. The product of this reaction is a suitable emulsifier for raw fats, oils and waxes, such as tallow, cocoanut oil, sperm oil, etc.

Example III 7.7 parts by weight of KOH (45%) is added to 77 parts by weight of blown menhaden oil in 15.3 parts by weight of diethylene glycol. This product is an excellent emulsifier for Trinidad asphalt.

Example IV 78.8 parts by weight of oil of sweet almond dispersed in 15.7 parts by weight of carbitol are saponified with 5.5 parts by weight of 45% KOH. This emulsifier may be used with waxes as a base for face creams. It may also be used as an emulsifier for white oil in making skin lotions.

Example V 64.5 parts by weight of castor oil dispersed in 19 parts by weight of diethylene glycol are saponified with 16.5 parts by weight of 45% KOH. This product is an excellent emulsifier for pine oil and it may be used in making bath oils. It is a good emulsifier for essential oils and finds utility in the manufacture of theatre sprays and other perfumed products.

While the composition of the invention is particularly adapted for use in emulsifying other substances, certain embodiments may be used directly in the treatment of textile and other materials.

Example VI 79.3 parts by weight of hydrogenated fish oil dispersed in 15.9 parts by weight of carbitol are saponified with 4.8 parts by weight of 45% KOH. This product is an excellent lubricant for sewing thread. The lubricant is readily removed from the sewn product by mere washing due to its emulsifiable character.

Example VII 82 parts by weight of Japan wax in 12.8 parts by weight of cellosolve are saponified with 5.7 parts of 45% KOH. This product finds utility in the sizing of warp yarns and after weaving the product may be freed from the composition by mere washing with water.

From the foregoing, it may be seen that the composition of the invention is an excellent emulsifier and due to these properties it also finds utility for other purposes wherein emulsifiable properties are essential or desirable.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having described my invention, what I claim as new and desire to secure by Letters Patent is:

1. A composition of matter comprising a soap, a degraded glyceride of a higher fatty acid and a glycol solvent, the molal ratio of soap to degraded glyceride being at least 1.

2. An emulsifier comprising a water-soluble soap, a degraded glyceride of a higher fatty acid and a glycol solvent, the molal ratio of soap to degraded glyceride being at least 1.

3. An emulsifier comprising a water-soluble soap, a degraded glyceride of a higher fatty acid and a glycol ether, the molal ratio of soap to degraded glyceride being at least 1.

4. An emulsifier comprising a potassium soap, a degraded glyceride of a higher fatty acid and a glycol ether, the molal ratio of soap to degraded glyceride being at least 1.

5. A composition of matter comprising a soap, diethylene glycol and a degraded glyceride of a higher fatty acid, the molal ratio of soap to degraded glyceride being at least 1.

6. An emulsifier comprising an alkali metal soap, a degraded glyceride of a higher fatty acid and diethylene glycol, the molal ratio of soap to degraded glyceride being at least 1.

7. An emulsifier comprising a potassium soap of a higher fatty acid, a degraded glyceride of a higher fatty acid and diethylene glycol, the molal ratio of soap to degraded glyceride being at least 1.

8. A process of producing an emulsifier which comprises partially saponifying a triglyceride in a glycol solvent with a strong alkali.

9. A process of producing an emulsifier which comprises partially saponifying a triglyceride in a glycol ether with potassium hydroxide.

10. A process of producing an emulsifier which comprises saponifying a triglyceride in a glycol solvent with a strong alkali in an amount not greater than that required to react with two of the three available ester groups.

11. A process of producing an emulsifier which comprises saponifying a triglyceride in a glycol ether with potassium hydroxide in an amount not greater than that required to react with two of the three available ester groups.

ROLAND KAPP.